United States Patent [19]

Marier

[11] Patent Number: 4,489,801
[45] Date of Patent: Dec. 25, 1984

[54] BRAKING ASSEMBLY FOR A SNOWMOBILE

[75] Inventor: Gregory J. Marier, Forest Lake, Minn.

[73] Assignee: Yamaha Motor Corporation, U.S.A., Coon Rapids, Minn.

[21] Appl. No.: 416,343

[22] Filed: Sep. 9, 1982

[51] Int. Cl.³ .................. B62M 27/02; F16D 55/16
[52] U.S. Cl. .................. 180/190; 188/72.2; 188/72.8
[58] Field of Search ............ 180/190; 188/72.2, 72.7, 188/72.8

[56] References Cited

U.S. PATENT DOCUMENTS

| | | | |
|---|---|---|---|
| 3,698,497 | 10/1972 | Bombardier | 180/190 |
| 3,952,843 | 4/1976 | Campbell et al. | 188/72.7 |
| 4,016,957 | 4/1977 | Osujo et al. | 188/72.7 |
| 4,362,524 | 12/1982 | Lob et al. | 180/190 |

Primary Examiner—Joseph F. Peters, Jr.
Assistant Examiner—D. Lynn Fugate
Attorney, Agent, or Firm—Williamson, Bains, Moore & Hansen

[57] ABSTRACT

A compact, highly efficient braking assembly for a snowmobile utilizes first and second plates, one of which swings relative to the other to actuate a wedging device therebetween when a brake control lever is actuated by an operator. The wedging device includes co-operating, adjacent, tapered slots on the confronting faces of the first and second plates and which confine a rolling spacer ball therebetween to urge the plates apart as the ball is forced from deep regions of the slots to more shallow regions during swinging of the moving plate. As one plate moves away from the other along a helical path, a pair of brake pads carried by the moving plate engages one side of a brake disc, forces the disc against a stationary pair of brake pads, cooperates with the stationary brake pads to grip the rotating brake disc therebetween and utilizes brake disc momentum to assist movement of the swinging plate toward braking position.

5 Claims, 13 Drawing Figures

BRAKING ASSEMBLY FOR A SNOWMOBILE

BACKROUND OF THE INVENTION

The invention relates to the field of brakes for snowmobiles or other light vehicles such as motorcycles, mopeds and the like and is particularly well suited for use with a direct drive snowmobile in which the engine crankshaft is mechanically coupled to a drive shaft which turns the endless track where the snowmobile has no intermediate shaft between the crankshaft and the drive shaft.

Snowmobile design is strongly directed toward reducing weight and size of mechanical components while retaining or increasing the efficiency and performance of the machine. Most commercially available machines utilize an intermediate shaft between drive shaft and crankshaft and which carries part of a V-type clutch mechanism which extends between the intermediate shaft and the engine's crankshaft. The intermediate shaft is then mechanically coupled by belt or chain drive to the drive shaft which carries sprockets to engage and turn the endless track. Presently available brake systems are usually positioned on and along the intermediate shaft and utilize a large diameter brake disc on the order of eight or more inches in diameter fixed to the intermediate shaft and occupy a substantial volume extending along that shaft. In snowmobiles having an intermediate shaft, the size and configuration of the cowl and tunnel in which the shafts are housed are sufficiently spacious to contain the large volume braking system without distorting the profile of the snowmobile. With a large diameter brake disc on an intermediate shaft, presently available disc brake units are satisfactory to provide necessary stopping power and no special components are required.

A reduction in size, weight, complexity and cost of the snowmobile drive system is possible by eliminating the intermediate shaft and coupling the engine crankshaft directly to the drive shaft of the endless track, but such changes also require the development of a new, more efficient, more compact brake system which will perform satisfactorily in a reduced space. Since one reason for elimination of the intermediate shaft is to permit the cowl and tunnel of the snowmobile to be reduced in size and weight, it is no longer permissible to use the large disc brake system used with the intermediate shaft. These changes necessitate the brake disc being positioned on the drive shaft, and preferably at an outer end of the drive shaft to provide access for inspection and maintenance. Elimination of the intermediate shaft also requires the positioning of a part of the clutch mechanism on the drive shaft and further reduces the amount of available axial space for the brake. Good snowmobile design also requires a long muffler for maximizing engine power and such a muffler configuration normally extends along and adjacent the brake area, requiring that the brake occupy a minimal amount of axial length along the drive shaft so as to allow adequate muffler space at the end of the shaft without increasing the body width of the snowmobile. Designing a compact brake system compatible with these size, shape and performance constraints can be extremely challenging.

Meeting the requirements of these described problems requires a small, compact brake system having a smaller brake disc diameter on the order of four to six inches. Since the drive shaft which will carry this disc is geared down to rotate more slowly than most intermediate shafts, an unusually effective caliper action is required with the small brake system to provide the needed stopping action.

In snowmobiles utilizing an intermediate shaft to carry the brake disc, the brake disc is generally mounted on a hub which is slidably mounted on the intermediate shaft by a splined or keyed coupling. Because the splined coupling often introduces a cocking or jamming action during braking while the brake disc is rotating at high speed, and because of the higher cost of machining the splined coupling, it is desirable that such splining be eliminated. Most snowmobile drive shafts have a central segment which is hexagonal in cross section with terminal end segments which are of round cross section for easy reception within the snowmobile bearings. Accordingly, it is desirable to provide a brake which will function on such commercially available drive shafts of hexagonal cross section thereby eliminating additional machining steps and reducing the cost of the necessary drive shaft.

The present invention provides a highly efficient, inexpensive and easily produced braking assembly which is usable on commercially available snowmobile drive shafts and which is sufficiently compact to be usable in the reduced cowl and tunnel space associated with a direct drive machine.

SUMMARY OF THE INVENTION

A braking assembly for a direct drive snowmobile is disclosed wherein the braking assembly is mounted on and adjacent the drive shaft which turns the endless track of the snowmobile and utilizes the rotational energy of the brake disc to assist the braking operation, thereby providing highly effective braking action with a substantially smaller braking assembly. The braking assembly utilizes a substantially smaller diameter brake disc than prior art units and has a substantially reduced side-to-side profile which occupies little axial space along the drive shaft, making it particularly suitable for a direct drive machine and for applications where a narrow braking assembly is required.

The invention utilizes a pair of stationary brake pads fixed to the snowmobile chassis and spaced from but closely confronting the obverse face of a brake disc which rotates with the drive shaft. The disc is fixed to a hub which is slidably carried by the hexagonal cross section of the drive shaft, permitting axial movement of the disc along the drive shaft toward and away from the stationary brake pads. A moveable caliper plate is positioned to confront the reverse face of the brake disc and carries a pair of brake pads which are closely spaced from the disc. A cover plate is positioned closely adjacent the caliper plate.

A wedging means is provided between the caliper and cover plates which, when actuated by an operator, urges the caliper and cover plates apart so as to force the brake pads of the caliper plate into contact with the rotating brake disc. The wedging means includes a pair of tapered slots positioned on the cover plate and a second pair of tapered slots on the caliper plate. The tapered slots of the caliper plate cooperate with the slots of the cover plate to contain a spacer ball therebetween. When one of the plates is rotated about the drive shaft axis relative to the remaining plate, the tapered slots on the swinging plate urge the spacer ball from the deep regions of the slots to a more shallow region, thereby urging the plates apart and forcing the brake pads against the brake disc.

Preferably the caliper plate located adjacent the rotating brake disc is swung about its axis to actuate the wedging means so as to bring the brake pads into contact with the rotating disc. As contact is established between the disc and the brake pads of the caliper plate, the frictional engagement between pads and disc urges the swinging plate in the direction of disc rotation, thereby further actuating the wedging means and better engaging the brake. This utilization of momentum of the rotating disc to aid application of the brake provides a kind of power assist effect to the braking process and allows extra braking force with reduced operator effort.

The invention is easily and inexpensively manufactured, highly reliable and sufficiently compact to meet the requirements of a direct drive machine. In addition, the brake assembly is usable with a commercially available hexagonal cross section snowmobile drive shaft and requires no additional drive shaft machining nor any splined or keyed couplings, thereby eliminating the cost of an intermediate shaft with its accompanying bearings and space losses and permitting the overall size and weight of the snowmobile to be reduced and its profile lowered.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENT

Figure 1:
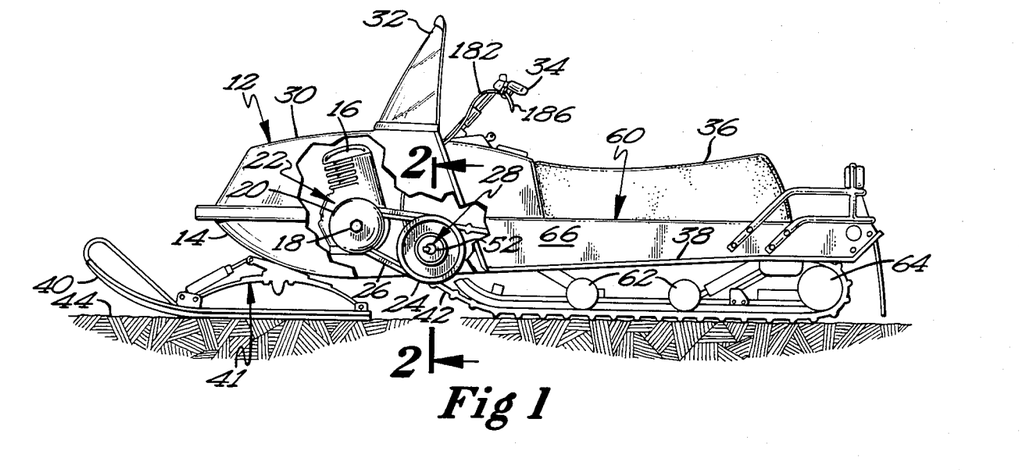
FIG. 1 is a side elevation view of a direct drive snowmobile with a portion of the cowl cut away to better illustrate the drive train.

Referring now to FIG. 1, a snowmobile 12 embodying the invention has a chassis 14 which carries snowmobile engine 16. The engine 16 includes an engine crankshaft 18 which carries primary sheave 20 of a V-belt type continuously variable clutch mechanism 22, the clutch further including secondary sheave 24 and V-belt 26 which mechanically connects the sheaves 20 and 24. Sheave 24 is fixed to drive shaft 28 in any manner known to the art so as to rotate drive shaft 28 in response to rotation of sheave 24. Since the structure and operation of a V-type reduction clutch mechanism is well known to the snowmobile art, no further description of the clutch will be made herein.

The engine 16 and clutch mechanism 22 are protectively housed beneath the cowl 30 of the snowmobile, and the snowmobile is otherwise provided with standard equipment such as windscreen 32, steering bars 34, bench seat 36 and running board 38. A pair of front skis 40 are coupled through suspension spring 41 with the steering bars 34 for steering of the vehicle and an endless track 42 provides propulsion over the ground surface 44.

Figure 2:
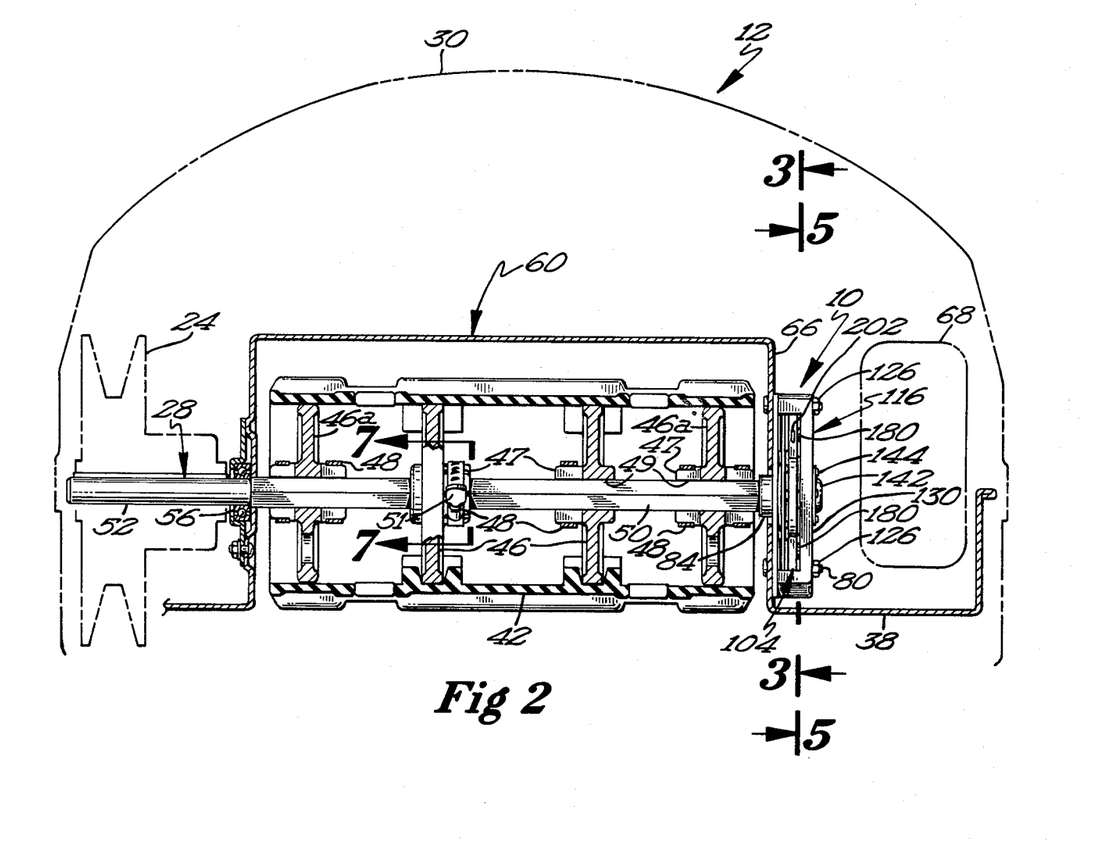
FIG. 2 is a cross sectional rear view of the drive shaft of the snowmobile of FIG. 1 taken in the direction of cutting plane 2—2 and showing an embodiment of the invention.

Referring now to FIGS. 1 and 2, the endless track 42 encircles a plurality of track support sprockets 46 and idlers 46a, each of which is retained to the drive shaft 28 in any known manner, a split collar 47 and adjustable tightening band 48 being preferred.

Figures 7, 8, 9, 10, 11, 12:
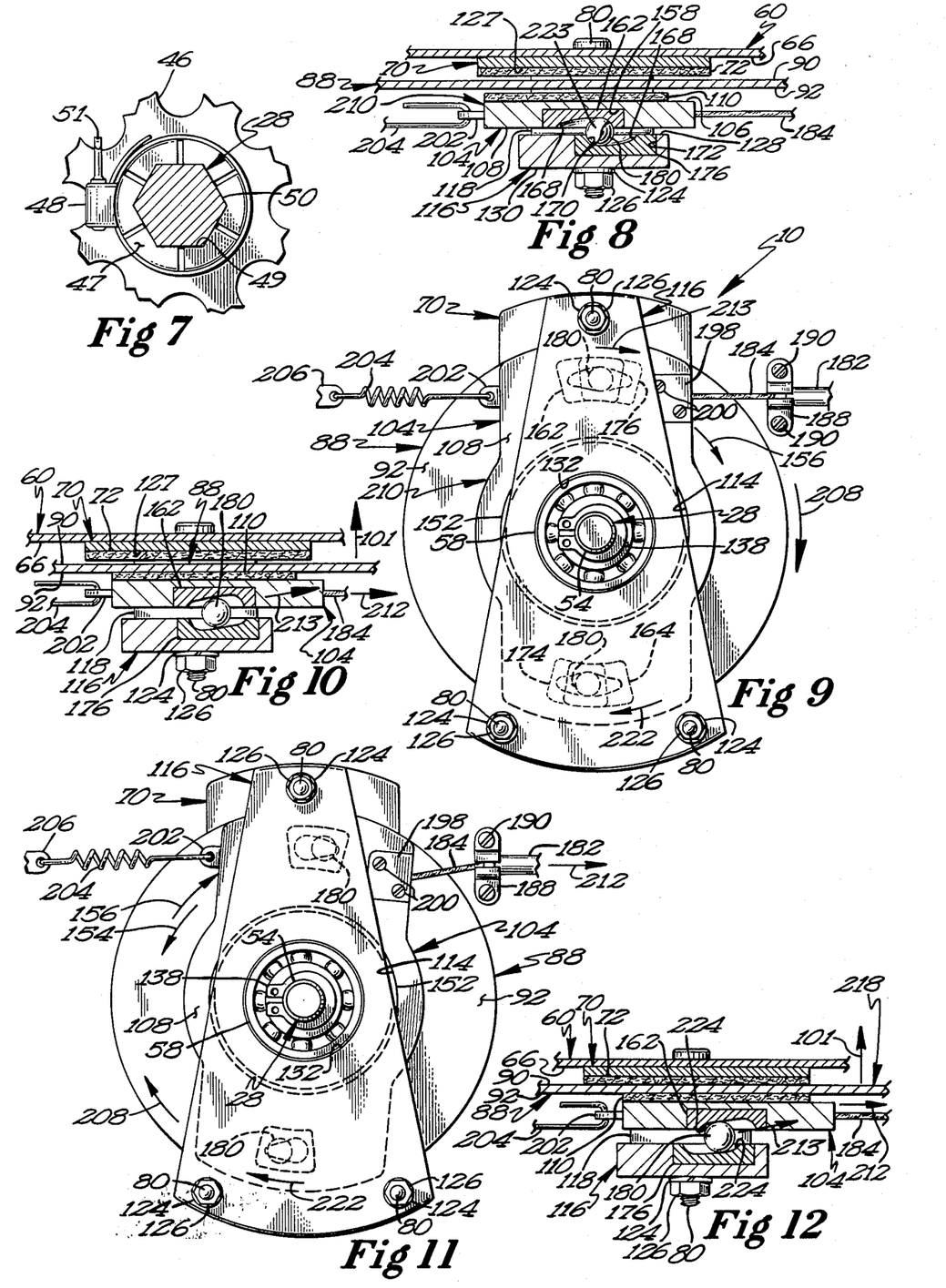
FIG. 7 is a cross sectional side view of the drive shaft of the snowmobile and taken in the direction of cutting plane 7—7 of FIG. 2.
FIG. 8 is a bottom cross sectional view of the braking assembly illustrating the assembly in a non-braking or rest position and taken in the direction 8—8 of FIG. 4.
FIG. 9 is a side view of the braking assembly of FIG. 8 showing the brake assembly in non-braking or rest position.
FIG. 10 is a bottom cross sectional view of the braking assembly showing the assembly in a partially engaged position between rest and full braking positions.
FIG. 11 is a side view of the braking assembly showing the assembly in the partially engaged braking position of FIG. 10.
FIG. 12 is a bottom cross sectional view showing the braking assembly in fully engaged braking position.
Figure 13:
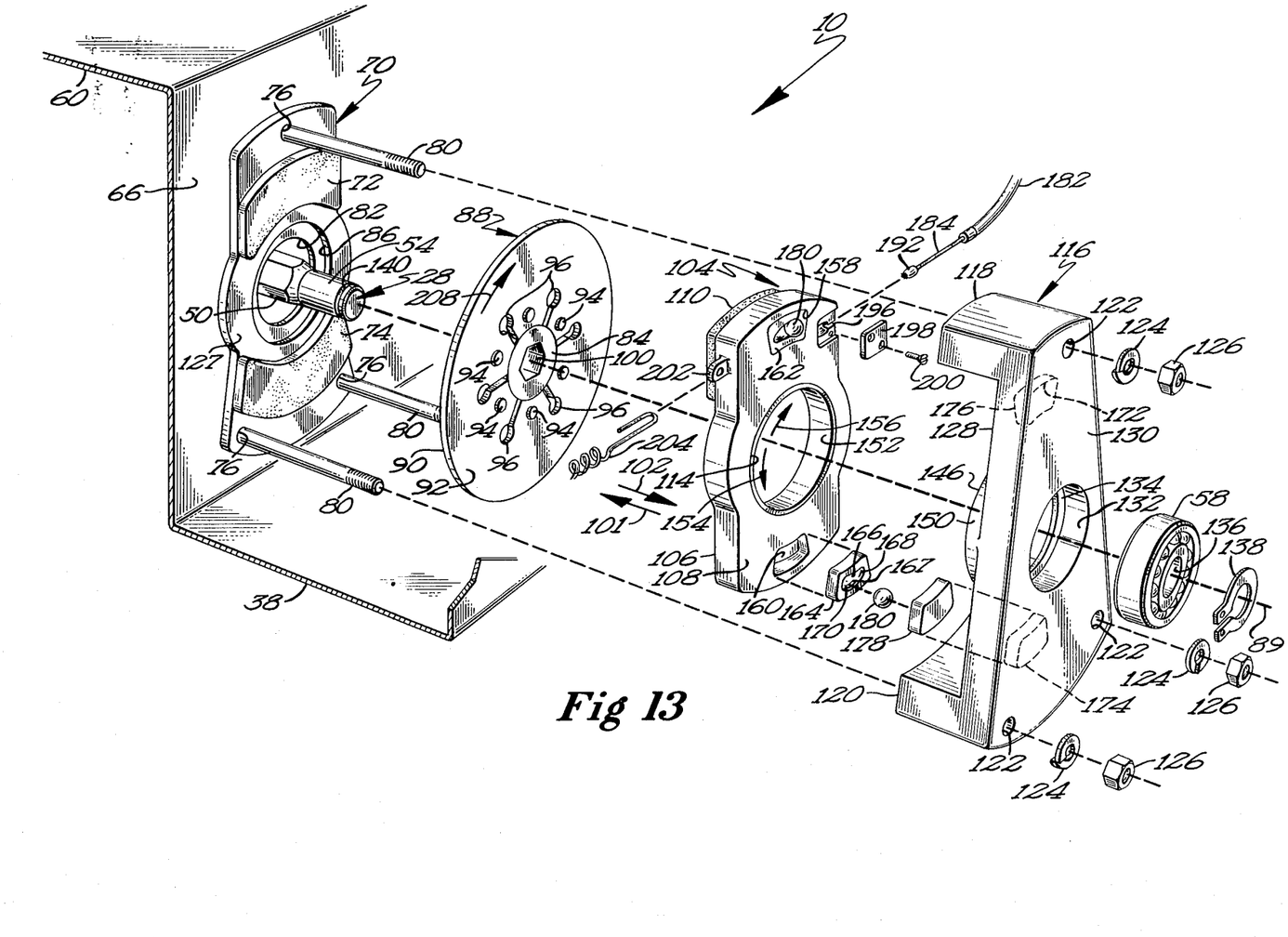
FIG. 13 is an exploded front perspective view showing the embodiment of the braking assembly.

Referring now to FIGS. 2 and 13, the drive shaft 28 has a longitudinal axis 89 and is provided with central hexagonal cross section segment 50 and left and right circular cross section end segments 52 and 54 respectively, the circular cross section segments 52 and 54 being rotatably journaled in bearings 56 and 58, respectively. The bearing 56 is secured to the side of the tunnel 60 which overlies and extends along the endless track 42. As best shown in FIGS. 2 and 7, the hexagonal segment 50 of the drive shaft 28 passes through the sprockets 46 and idlers 46a, each sprocket and idler including a central aperture 49 and a split or castellated collar 47. An adjustable strap 48 encircles each castellated collar 47 and by tightening screw 51, the collar is drawn tightly about drive shaft 28. As best shown in FIG. 1, the chassis 14 includes a pair of idler wheels 62, rear idler 64 and supporting hardware for mounting the wheels 62 and idler 64 to rotatably mount the endless track 42.

Positioned on the outer metal wall 66 of the tunnel 60 and confronting muffler 68 is a braking assembly 10 embodying the invention. Attachment of the braking assembly 10 to the metal wall 66 permits the use of the wall 66 as a heat sink into which the brake assembly can dissipate excess heat generated during braking.

Referring now to FIGS. 3-5 and 13, the braking assembly 10 utilizes a rigid stationary mounting member 70 to which upper and lower brake pads 72 and 74, respectively, are firmly attached by any means known to the art, an appropriate adhesive material being preferred. The pads are positioned on diametrically opposed sides of drive shaft 28 so as to avoid cocking of brake disc 88 during brake application. The mounting member 70 and its attached brake pads 72 and 74 collectively comprise a first brake pad means which is attached to the tunnel wall 66 of the chassis 12. The mounting member 70 has mounting bores 76 which communicate with identical bores 78 in the tunnel wall 66, permitting threaded mounting bolts 80 to be passed through the bores 78 in tunnel wall 66 and through the communicating bores 76 to attach the brake assembly 10 to the wall 66, as will be described further hereafter.

The tunnel wall 66 has a drive shaft aperture 82 through which the drive shaft 28 passes, the aperture 82 being large enough to receive a sleeve 98 which extends axially from brake disc mounting hub 84, which will be described further hereafter. Positioned concentrically with the center of drive shaft aperture 82 and the axis of drive shaft 28 is an aperture 86 which passes through mounting member 70 so as to accommodate the sleeve 98 of hub 84.

Figures 3, 4, 5, 6:
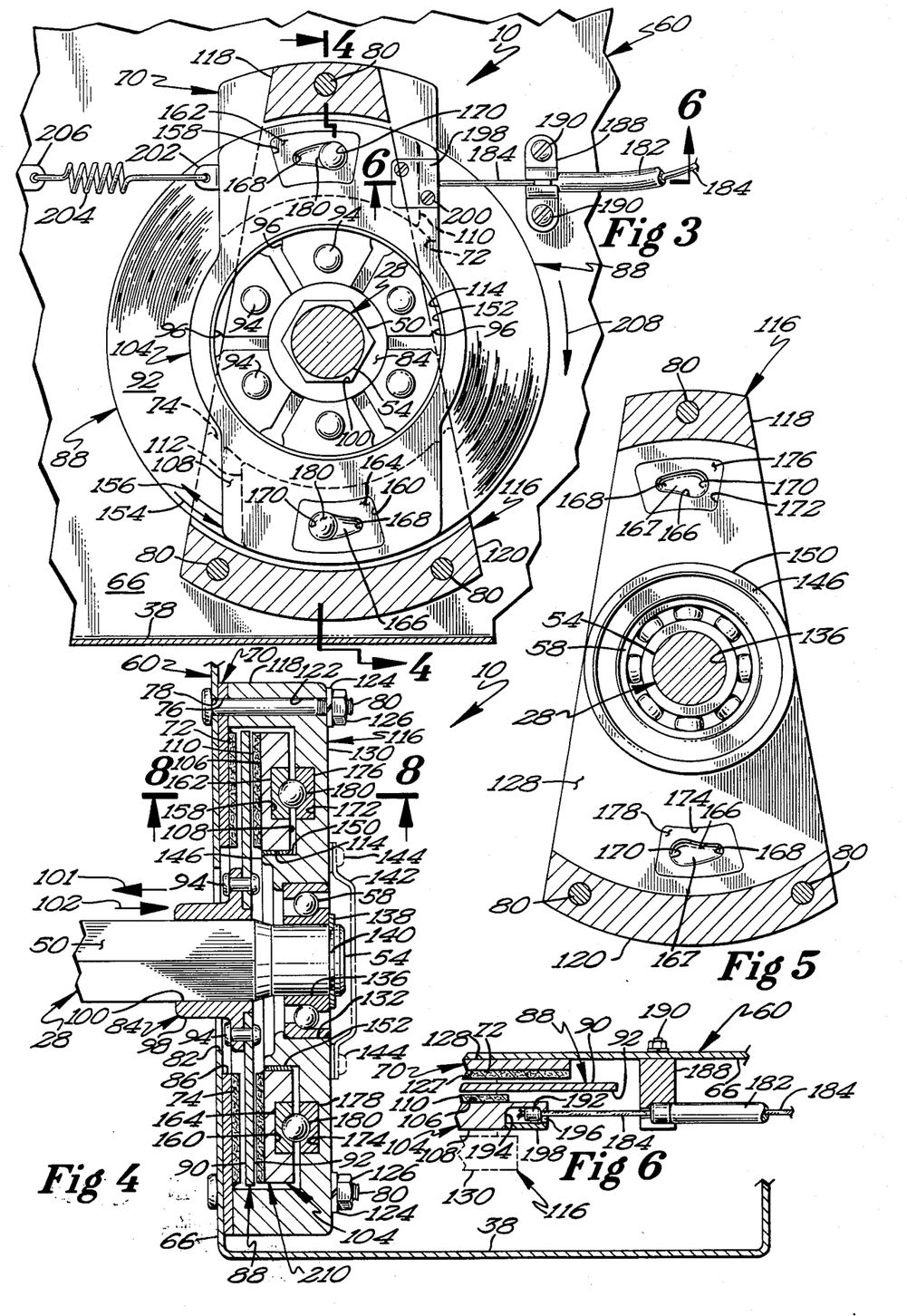
FIG. 3 is a cross sectional side view showing a part of the brake assembly and taken in the direction of cutting plane 3—3 of FIG. 2.
FIG. 4 is a cross sectional view of the braking assembly of FIG. 3 taken in the direction of cutting plane 4—4 of FIG. 3.
FIG. 5 is a cross sectional view of a portion of the braking assembly and taken in the direction of cutting plane 5—5 of FIG. 2.
FIG. 6 is a bottom cross sectional view of a portion of the braking assembly and taken in the direction of cutting plane 6—6 of FIG. 3.

As best shown in FIGS. 4 and 13, a rigid, circular brake disc 88 having a central axis 89 and obverse and reverse flat faces 90 and 92 respectively, includes a central hub 84 and is rigidly attached to the hub 84 by any known means, a plurality of rivots 94 being preferred. Radially extending channels 96 are cut into the disc 88 to eliminate undesirable heat distortion of the disc during braking.

The hub 84 has an outwardly extending sleeve 98 which extends axially from the disc face 90 in the direction of the tunnel 66 and is coaxial with the shaft 28. The apertures 86 and 82 of the mounting member 70 and the tunnel, respectively, are of sufficient diameter to permit easy passage of the sleeve 98 through the apertures and into the tunnel interior so as to minimize the amount of usable axial space occupied by the brake 10.

The hub 84 is provided with an aperture 100 of hexagonal cross section centered on and extending along the central axis 89 of the disc and sized slightly larger than the hexagonal cross section segment 50 of drive shaft 28 so that the hub 84 and its attached disc 88 will slide freely on the hexagonal segment 50 in axial directions 101 and 102. Accordingly, the disc 88 is free to move axially along the segment 50 of drive shaft but is retained by the hexagonal segment 50 on the drive shaft so as to prevent angular displacement of the disc relative to the drive shaft 28 during rotation of the drive shaft. As best shown in FIG. 4, the disc 88 is positioned on the drive shaft with its obverse face 90 spaced from but closely confronted by the brake pads 72 and 74 of mounting member 70 when the brake is disengaged.

As best shown in FIGS. 3, 4 and 13, the brake assembly 10 includes a first plate or cover plate 116 with upper and lower mounting lugs 118 and 120, respectively, extending toward and bearing against the mounting member 70. Bores 122 are aligned with and receive mounting bolts 80, and the cover plate 116 is rigidly secured to the member 70 by means of lock washers 124 and nuts 126. The lugs 118 and 120, when positioned against the mounting member 70, provide a spacer to separate the surface 127 of member 70 from the obverse face 128 of plate 116.

The reverse face 130 of plate 116 has a circular central aperture 132 concentric with axis 89 and an annular shoulder 134 extends inwardly from the aperture, permitting the drive shaft bearing 58 to be received within the aperture against the shoulder 134. When the bearing 58 is in position on drive shaft 28 within aperture 132, a C-ring 138 tightly engages annular slot 140 in the drive shaft to keep the drive shaft and bearing in operating position. A protective cap 142 may be secured over the end of the drive shaft 28 by screws 144 to assure weather tight protection for drive shaft and bearing.

As best shown in FIGS. 3, 4 and 13, the brake assembly 10 further includes a rigid second plate or caliper plate 104 having obverse and reverse faces 106 and 108, respectively. Brake pads 110 and 112 are positioned on face 106 on diametrically opposed sides of circular bearing aperture 114 and confront the reverse face 92 of the brake disc 88. These brake pads 110 and 112 constitute a second brake pad means which cooperate with pads 72 and 74 as will be described hereafter. While a pair of brake pads has been shown as being used with the mounting member 70 and another pair on caliper plate 104, it should be understood that the invention is not limited to the use of two pairs of such pads and that a single pair of confronting pads or more than two pairs could be sutstituted and is within the purview of the invention. It has been found desirable that the brake pads be positioned on the member 70 and on plate 104 on diametrically opposed sides of the drive shaft 28 to apply a balanced stopping force so as to avoid cocking or canting of disc 88. Aperture 114 is positioned with its central axis coaxial with the axis of the drive shaft 28 as will be described further hereafter during brake application. The brake pads 110 and 112 are in substantial horizontal alignment with cooperating brake pads 72 and 74, respectively, so as to cooperate with pads 72 and 74 in engaging the brake disc 88 therebetween.

The cover plate 116 has a substantially cylindrical boss or sleeve extending outwardly from its obverse surface 128, the boss 146 having its central axis coaxial with the axis of the bearing aperture 114. The boss 146 has a cylindrical, peripheral surface 150 which provides a bearing surface which fits within aperture 114 of caliper plate 104 to journal the plate 104 for swinging movement. A layer of bearing material 152 is fixed to the edge of aperture 114, permitting the caliper plate 104 to swing in directions 154 and 156 about axis 89 and further permits movement of caliper plate 104 relative to cover plate 116 in directions 101 and 102. Accordingly, the boss 146 provides a plate mounting means by which cover plate 116 slidably mounts the caliper plate 104 for both sliding movement along the axis 89 and angular displacement in directions 154 and 156 about that axis, permitting movement of plate 104 between rest position 210 and braking position 218.

As best shown in FIG. 13, the caliper plate 104 has a pair of elongated arcuate sockets 158 and 160 formed in the reverse surface 108 and sized to receive identical slot members 162 and 164, respectively. The slot members 162 and 164 are cast or, alternatively, formed of powdered metal and are each provided with a slot 166 having a slot floor 167 (FIGS. 5 and 13) whose depth varies from a shallow region 168 to a deep region 170.

The obverse surface 128 of cover plate 116 is also provided with upper and lower sockets 172 and 174 into which slot members 176 and 178 are received. The slot members 176 and 178 are identical to members 162 and 164 described above. When plates 104 and 116 are in assembled operating position, as best shown in FIG. 4, the slot members 162 and 176 confront one another directly as do slot members 164 and 178. When the brake is in the disengaged, non-braking rest position 210 illustrated in FIG. 4, the deep regions 170 of the slot members 162 and 176 are in direct communicating relationship so as to receive and confine a rigid spacer ball 180 therebetween. Similarly, when in the non-braking rest position 210, the deep regions of slot members 178 and 164 confront and communicate with one another to receive and confine rigid spacer ball 180. As will be explained further hereafter, rotation of the plate 104 in the direction 156 causes slot members 162 and 164 to swing in direction 156 and causes the deep regions 170 to diverge and causes the shallow regions 168 to converge, thereby interacting with the rigid spacer ball 180 to push caliper plate 104 away from cover plate 116 in direction 101 to the braking position 218.

The slot members 162 and 164 in cooperation with slot members 176 and 178 and spacer balls 180 collectively comprise a wedging means by which the caliper plate 104 is urged from a rest position to a braking position. It should further be noted that the slot members and the enclosed spacer balls in cooperation with the control cable collectively provide a means for moving the caliper plate along a helical path toward the disc, curving in the rotational direction 156 and having a central axis coincident with the drive shaft axis as the caliper plate moves from rest position to braking position.

A control cable housing 182 having a hollow interior channel which slidably receives cable 184 therealong, extends from the handlebar 34, where it connects in a well known manner with brake lever 186, to a location on the lower chassis (FIG. 3), where it is rigidly clamped to the tunnel wall 66 by clamp 188. The bracket 188 is secured to the tunnel wall 66 by bolts and nuts 190, by welding, or other suitable means.

The lower end of the cable wire 184 has an enlarged bead 192 (FIGS. 6 and 13) which is received within an aperture 194 in caliper plate 104. The aperture 194 communicates with the outer edge of the plate 104 through a narrow neck 196 which is large enough to permit the cable 184 to be inserted in the neck but too small to permit the escape of the enlarged bead 192 from within aperture 194 when cover 198 is placed over the aperture 194 and secured thereto by screws 200. While a specific means of attachment of the bead end of cable 184 has been shown, it should be understood that other means known to the art for attachment of such a cable including a screwed in terminal end is also contemplated and is within the purview of the invention. The cable housing 182, cable 184, brake lever 186 and the mounting hardware used in attaching these elements to plate 104 and to the chassis collectively comprise a control means by which the operator can actuate the brake assembly. While a specific linkage has been shown in the form of cable housing 182 and cable 184, other linkage arrangements known to the art may be substituted and are within the purview of the invention.

The caliper plate 104 is provided with a laterally extending ear 202 to which a coil spring 204 is attached, the spring 204 having its remaining end secured to a bracket 206 on the chassis as best shown in FIG. 3. This spring 204 is under tension when the plate 104 is in the rest position shown in FIG. 3 and serves as a spring means or return means to pull caliper plate 104 from the braking position of FIG. 11 back to the rest position.

The slot members 162, 164, 176 and 178 are easily removable from the sockets 158, 160, 172 and 174, respectively, permitting easy replacement when the slot members become worn. It should also be understood that the described slot members need not be used and may instead be replaced by slots 166 cut directly into the plate 104 and the plate 116, and such alternative construction is within the purview of the invention.

In operation, during normal forward travel of the snowmobile 12 when no braking is being applied and the plate 104 is in rest position 210, the brake disc 88 turns freely in direction 208 and is closely spaced from but unimpeded by the brake pads 72, 74, 110 and 112, as best shown in FIGS. 3, 4, 8 and 9. During unimpeded running of the snowmobile, while the caliper plate 104 remains in the rest position 210 the rigid spacer ball 180 remains seated in the deep regions 170 of slot members 162 and 176 and plates 104 and 116 are at their minimum distance of separation from one another. When the brake lever 186 is not being applied by the operator, coil spring 204 biases the caliper plate 104 to the rest position 210 and retains it there.

When the brake assembly 10 is to be operated and the brake applied, the operator squeezes brake lever 186 causing the rigid cable 184 to slide within cable housing 182 in direction 212, as shown in FIGS. 10 and 11, swinging caliper plate 104 about the axis of drive shaft 28 in direction 156. During such swinging movement of caliper plate 104, the bearing material 152 which is fixed to bearing aperture 114 slides smoothly on cylindrical bearing surface 150 of the boss 146 as shown in FIG. 13.

As best seen in FIGS. 8–11, as the caliper plate 104 is swung in direction 156, the slot members 162 and 164 move laterally with caliper plate 104 in directions 213 and 222, respectively, relative to the stationary slot members 176 and 178 of cover plate 116. This movement causes the deep regions 170 in slot members 162 and 164 to move away from the deep regions of stationary slot members 176 and 178, respectively. As a result of this movement, the spacer ball 180, which was substantially contained within the volume 223 (FIG. 8) defined by the directly communicating deep regions 170 of slot members 162 and 176, is moved to the right in direction 213 (as viewed in FIG. 10) during movement of slot member 162 in direction 212. As slot member 162 moves in direction 212, a more shallow region of the slot member 162 confronts the deep region 170 of slot member 176, resulting in the spacer ball 180 being urged in direction 213 and the virtually incompressible ball 180 forcing caliper plate 104 axially away from slot member 176 in direction 101. Movement of the plate in direction 101 brings the brake pads 110 and 112 into contact with the reverse face 92 of brake disc 88 as shown in FIG. 10 and begins sliding the disc 88 along shaft 28 toward the stationary brake pads 72 and 74.

While only the interaction between slot members 162 and 176 has been described in the previous paragraph, it should be understood that the slot members 164 and 178 cooperate simultaneously in a similar manner to urge the caliper plate 104 toward the brake disc and works in substantially identical fashion except that slot member 164 moves in direction 222 (FIG. 11) as the brake is applied.

As the control cable 184 is further extended in direction 212 by the operator, the ball 180 between slot members 162 and 176 is urged still further along the slot in direction 213 toward the shallow regions 168 of the members as the slot member 162 on caliper plate 104 continues to move in direction 212 (FIGS. 10 and 12). Movement of the ball in direction 213 urges the caliper plate 104 in direction 101, forcing the brake disc 88 still further in direction 101 until the disc reaches braking position 218 and contacts stationary brake pads 72 and 74. It should be understood that while only the interaction between upper slot members 162 and 176 was described in detail as to how the disc 88 is urged against brake pads 72 and 74, the lower slot members 164 and 178 perform an identical role in moving the disc into braking position 218. When such contact is achieved, further extension by the operator on the brake cable 184 causes the brake pads 72 and 74 to engage the obverse face 90 and brake pads 72 and 74 to engage the reverse face 92 of the rotating disc and to cooperate to grip the disc therebetween to retard and stop disc rotation.

As best shown in FIG. 12, when the brake assembly 10 is in the braking position 218 with the brake fully applied, the balls 180 are not moved to the most shallow ends 224 of the slots. The slot depths are designed so that a new brake will be fully applied well before the ball 180 reaches the most shallow ends 224 so that as the brake pads gradually wear down through use, the brake will be self adjusting with the ball 180 moving further toward the most shallow ends 224 as the brake pads wear down and as further movement of the caliper plate 104 in direction 101 is needed in order to reach braking position 218.

As the brake pads 110 and 112 of caliper plate 104 contact brake disc 88 as it rotates in direction 208, the frictional engagement between the reverse face 92 of the disc and the brake pads causes the rotating brake disc to pull the brake pads and caliper plate 104 in the direction of disc rotation 208, thereby utilizing brake disc momentum in assisting the application of the brake and further encouraging the movement of slot members 162 and 176 in directions 212 and 222, respectively. This type of power-assist action and cooperation between disc 88 and caliper plate 104 reduces the amount of effort required by the operator to engage the brake and substantially increases efficient braking operation.

When the caliper plate 104 is in the braking position 218 shown in FIG. 12, the brake pads of mounting member 70 directly confront the brake pads on caliper plate 104 across the brake disc 88 and tightly engage the disc therebetween.

While the description of the brake's operation has described movement of the plate 104 in directions 156 and in an axial direction 101, it should be understood that in operation, the movement of plate 104 includes components of movement in both directions and that the resultant direction of movement of plate 104 is along a helical path having its axis coaxial with the drive shaft axis as the caliper plate moves toward the disc 88.

During brake application, frictional engagement between the brake pads and the brake disc generates heat which must be effectively dissipated. The positioning of mounting member 70 on the metal tunnel wall 66 utilizes the wall as a heat sink and is effective to dissipate much heat from the brake assembly 10.

In this description the slot members 162, 164, 176 and 178 have been described as each having a deep region 170 and shallow region 168. It should be understood that each slot 166 of the slot members varies steadily in depth from a maximum depth at one end of the slot to a minimum depth at the opposite end. When the description of the invention refers to the deep regions of confronting slots being in communication, such language refers to the confronting slots being able to adequately contain a spacer ball therebetween without the caliper plate brake pads being urged into contact with the brake disc 88. When this description refers to the shallow regions of confronting slots being in communication, such language refers to the confronting slots being so positioned that the spacer balls are situated at any location therealong which causes contact between the caliper plate brake pads and the brake disc.

When the operator releases the brake lever 186, spring 204 pulls the caliper plate 104 to rest position 210, and spacer balls 180 roll back to the deep regions 170 of the slot members, resulting in caliper plate 104 releasing its pressure against the brake disc 88 to end the braking action.

While the preferred embodiments of the present invention have been described, it should be understood that various changes, adaptions and modifications may be made therein without departing from the spirit of the invention and the scope of the appended claims.

What is claimed is:

1. A braking assembly aselectively actuatable by an operator and usable with a snowmobile having a chassis, an endless track rotatably supported by the chassis, and an engine mounted to the chassis and including an engine crankshaft, such braking assembly comprising:

a drive shaft having a longitudinal axis and mechanically connectable with the engine crankshaft and with the endless track, said drive shaft being rotatably mountable relative to the chassis for rotational movement about said longitudinal axis in a first rotational direction associated with forward movement of the snowmobile;

a brake disc having a central axis and obverse and reverse faces and mounted coaxially on said drive shaft for fixed rotation therewith, said disc being slidable along said drive shaft;

first brake pad means mountable to the chassis and positioned to closely confront said obverse face of said brake disc and being stationary relative to the chassis;

a first rigid plate having obverse and reverse surfaces and positioned at a predetermined distance from said disc;

a second rigid plate having obverse and reverse surfaces with its reverse surface confronting and closely spaced from the obverse surface of said first rigid plate;

second brake pad means mounted on said obverse surface of said second plate with said second brake pad means closely confronting the reverse face of said brake disc;

said first plate including plate mounting means slidably mounting said second plate for movement toward and away from said first plate in directions parallel to said axis of said drive shaft between a rest position, wherein said second brake pad means is spaced from said brake disc, and a braking position, wherein said second brake pad means contacts said brake disc and cooperates with said first brake pad means to grip said brake disc therebetween;

said plate mounting means swingably mounting said second plate for angular displacement about said longitudinal axis of said drive shaft between said rest position and said braking position;

control means extending between said second plate and the chassis and actuatable by the operator to produce angular displacement of said second plate from said rest position to said braking position;

said confronting surfaces of said first and second plates each having a pair of spaced apart slots, each said slot having a shallow region and a deep region with a slot floor joining said shallow and deep regions and said first and second plates positioned with said deep regions of said slots on said first plate confronting and communicating with said deep regions of said slots on said second plate when said second plate is in said rest position, and said shallow regions of said slots confronting and communicating with each other when said second plate is in said braking position;

a pair of rigid spacer balls, with one of said spacer balls being confined in each pair of confronting, communicating slots so that when said second plate is in said rest position, said spacer balls are substantially within said deep regions with said first and second plates closely adjacent each other and when said second plate is swung by actuation of said control means to said braking position, said spacer balls are urged to the shallow regions of said slots thereby urging said first and second plates apart and causing said second brake pad means on said second plate to contact said disc and to cooperate with said first brake pad means to grip said brake disc therebetween;

spring means to return said second plate from said braking position to said rest position when said control means is released by the operator;

said drive shaft including a central segment having a substantially hexagonal cross section and further including a pair of end segments at opposite ends of said drive shaft, each said end segment being adjacent said central segment and having a substantially round cross section; and said brake disc including a central hub extending along said central axis of said disc and having a central hexagonal cross section aperture mounted on said central segment of said drive shaft, said hub extending laterally from said brake disc along said drive shaft toward said first brake pad means.

2. The combination of claim 1 wherein said slots comprising said pair of slots on said first plate are positioned on opposite sides of said drive shaft, and said slots comprising the pair of slots on said second plate are positioned on opposite sides of said drive shaft and confront said slots on said first plate to thereby selectively urge said second plate along said hexagonal central segment without camming or jamming between said segment and said hub when said second plate moves from said rest position to said braking position.

3. In combination with a snowmobile having a chassis, an endless track rotatably supported by the chassis, and an engine mounted to the chassis and including an engine crankshaft, an improved braking assembly selectively actuatable by an operator comprising:

a track drive shaft having a longitudinal axis and mechanically connected with said engine crankshaft and with said endless track, said track drive shaft being rotatably mounted to said chassis for rotational movement about said longitudinal axis in a first rotational direction associated with forward movement of the snowmobile;

said drive shaft including a central segment having a regular hexagonal cross section extending at least partially along said drive shaft;

a brake disc having obverse and reverse faces and mounted on said hexagonal cross section segment of said drive shaft for fixed rotation therewith, said disc being freely slidable along said central segment of said track drive shaft;

first brake pad means fixed to said chassis adjacent said track drive shaft and positioned to closely confront said obverse face of said brake disc;

a first rigid plate having obverse and reverse surfaces and positioned at a predetermined distance from said disc;

a second rigid plate having obverse and reverse surfaces with its reverse surface confronting and closely spaced from said obverse surface of said first rigid plate;

second brake pad means mounted on said obverse surface of said second plate, said second brake pad means closely confronting the reverse face of said brake disc;

one of said plates including plate mounting means slidably mounting the other of said plates for movement toward and away from said one of said plates in directions parallel to said axis of said track drive shaft between a rest position, wherein said second brake pad means is spaced from said brake disc, and a braking position, wherein said second brake pad means contacts said brake disc and cooperates with said first brake pad means to grip said brake disc therebetween;

said plate mounting means swingably mounting said other plate for angular movement about said longitudinal axis of said track drive shaft between said rest position and said braking position, wedging means carried by at least one of said plates and interposed between said plates to move said other of said plates from said rest position to said braking position;

control means on the chassis and accessible to the operator to swing said other of said plates so as to actuate said wedging means and move said other of said plates from said rest position to said braking position;

return means to return said second plate from said braking position to said rest position when said control means is no longer actuated by the operator.

4. The combination of claim 3 wherein:

said wedging means includes a pair of slots positioned on said obverse surface of said first plate with said slots being positioned on opposite sides of said track drive shaft;

said wedging means further including a pair of slots positioned on said reverse surface of said second plate with said slots of said second plate being positioned on opposite sides of said track drive shaft and confronting the said slots on said first plate;

said wedging means further including a pair of balls, with a said ball being confined between each of the confronting slots of said first and second plates so that as said second plate is moved from said rest position to said braking position, said brake disk slides freely along said hexagonal cross section central segment of said track drive shaft without camming between said central segment and said disk.

5. In combination with a snowmobile having a chassis, an endless track rotatably supported by said chassis, and an engine mounted to said chassis and including an engine crankshaft, an improved braking assembly selectively actuatable by an operator comprising:

a combined brake and track drive shaft having a longitudinal axis and mechanically connected with said engine crankshaft and with said endless track, said combined brake and track drive shaft being rotatably mounted to said chassis for rotational movement about said longitudinal axis in a first rotational direction associated with forward movement of the snowmobile;

said combined brake and track drive shaft including a central segment having a regular hexagonal cross section extending at least partially along said combined drive shaft;

a brake disk having obverse and reverse faces and mounted on said hexagonal cross section segment of said combined brake and drive shaft for fixed rotation therewith, said disk being freely slidable along said central segment of said combined brake and track drive shaft;

first brake pad means fixed to said chassis adjacent said combined brake and track drive shaft and positioned to closely confront said obverse face of said brake disk; and displacement means carried by said chassis for selectively moving said brake disk axially along said hexagonal cross section segment of said combined brake and track drive shaft between a rest position, wherein no braking occurs, and a braking position, wherein said disk is in frictional engagement with said first brake pad means to thereby arrest rotational movement of said disk and said combined brake and track drive shaft.

* * * * *

UNITED STATES PATENT AND TRADEMARK OFFICE
CERTIFICATE OF CORRECTION

PATENT NO. : 4,489,801
DATED : December 25, 1984
INVENTOR(S) : Gregory J. Marier It is certified that error appears in the above-identified patent and that said Letters Patent is hereby corrected as shown below:

Column 1, lines 37-68 should read as follows:

-- A reduction in size, weight, complexity and cost of the snowmobile drive system is possible by eliminating the intermediate shaft and coupling the engine crankshaft directly to the drive shaft of the endless track, but such changes also require the development of a new, more efficient, more compact brake system which will perform satisfactorily in a reduced space. Since one reason for elimination of the intermediate shaft is to permit the cowl and tunnel of the snowmobile to be reduced in size and weight, it is no longer permissible to use the large disc brake system used with the intermediate shaft. These changes necessitate the brake disc being positioned on the drive shaft, and preferably at an outer end of the drive shaft to provide access for inspection and maintenance. Elimination of the intermediate shaft also requires the positioning of a part of the clutch mechanism on the drive shaft and further reduces the amount of available axial space for the brake. Good snowmobile design also requires a long muffler for maximizing engine power and such a muffler configuration normally extends along and adjacent the brake area, requiring that the brake occupy a minimal amount of axial length along the drive shaft so as to allow adequate

UNITED STATES PATENT AND TRADEMARK OFFICE
CERTIFICATE OF CORRECTION

PATENT NO. : 4,489,801

DATED : December 25, 1984

INVENTOR(S) : Gregory J. Marier

It is certified that error appears in the above-identified patent and that said Letters Patent is hereby corrected as shown below:

muffler space at the end of the shaft without increasing the body width of the snowmobile. Designing a compact brake system compatible with these size, shape and performance constraints can be extremely challenging.

Meeting the requirements of these described problems requires a small, compact brake system having a smaller brake disc diameter on the order of four to six inches. Since the drive shaft which will carry this disc is geared down to rotate more slowly than most interme- --.

Column 10, line 11, "aselectively" should read --selectively--.

Signed and Sealed this

Twenty-sixth Day of November 1985

[SEAL]

Attest:

DONALD J. QUIGG

Attesting Officer

Commissioner of Patents and Trademarks